(12) United States Patent
Norman et al.

(10) Patent No.: US 12,306,112 B2
(45) Date of Patent: May 20, 2025

(54) METHODS AND APPARATUS FOR DETECTING DEFECTS IN SEMICONDUCTOR SYSTEMS

(71) Applicant: Axiomatique Technologies, Inc., Fremont, CA (US)

(72) Inventors: Trevor A. Norman, Fremont, CA (US); Robert Mamazza, Palm Harbor, FL (US); Francisco Xavier Machuca, Oakland, CA (US)

(73) Assignee: AXIOMATIQUE TECHNOLOGIES, INC., Fremont, CA (US)

( * ) Notice: Subject to any disclaimer, the term of this patent is extended or adjusted under 35 U.S.C. 154(b) by 0 days.

(21) Appl. No.: 17/147,317

(22) Filed: Jan. 12, 2021

(65) Prior Publication Data

US 2022/0120698 A1  Apr. 21, 2022

Related U.S. Application Data

(63) Continuation-in-part of application No. 17/073,042, filed on Oct. 16, 2020.

(51) Int. Cl.
*G01N 21/95* (2006.01)
*G01N 21/88* (2006.01)
*G01N 23/083* (2018.01)
*G01N 23/18* (2018.01)
*G06T 7/00* (2017.01)

(52) U.S. Cl.
CPC ..... *G01N 21/9501* (2013.01); *G01N 21/8806* (2013.01); *G01N 23/083* (2013.01); *G01N 23/18* (2013.01); *G06T 7/0004* (2013.01); *G06T 2207/30148* (2013.01)

(58) Field of Classification Search
CPC .......... G01N 21/9501; G01N 21/8806; G01N 23/083; G01N 23/18; G06T 7/0004; G06T 2207/30148
See application file for complete search history.

(56) References Cited

U.S. PATENT DOCUMENTS 6,796,697 B1     9/2004  Bragg et al.
7,602,962 B2 *  10/2009  Miyamoto ........... G06K 9/6253
                                                    382/149

(Continued)

FOREIGN PATENT DOCUMENTS

WO     WO-2004/072629         8/2004

OTHER PUBLICATIONS

International Search Report and Written Opinion dated Dec. 28, 2021, received in related PCT/US21/55300 filed Oct. 15, 2021 (11 pages).

*Primary Examiner* — Rebecca C Bryant
(74) *Attorney, Agent, or Firm* — Rivka Friedman

(57) ABSTRACT

A defect detection system comprising of an incoherent light source and a collimating light source attachment to produce spatially coherent light waves (e.g., X-rays) that are capable of deeply penetrating a device under test (e.g., a semiconductor). Changes in the spatial coherence of the light waves incident upon the device under test may be utilized to generate one or more electronic maps that indicate one or more physical gauges for length, area, or volume, one or more concentration of elements or distributions in space, and one or more defects within the device under test, such as, cracks, breaks, gaps, and/or air pockets within the device under test.

18 Claims, 10 Drawing Sheets

(56) References Cited

U.S. PATENT DOCUMENTS

| | | |
|---|---|---|
| 9,025,635 B2 | 5/2015 | Goutain et al. |
| 11,041,714 B2 * | 6/2021 | Peidous ................. G01B 11/24 |
| 2002/0088952 A1 | 7/2002 | Rao et al. |
| 2009/0206242 A1 | 8/2009 | Mizaikoff et al. |
| 2014/0268105 A1 | 9/2014 | Bills et al. |
| 2015/0117610 A1 | 4/2015 | Veldman et al. |
| 2016/0011122 A1 * | 1/2016 | Pacheco ............. G01N 21/8806 356/369 |
| 2019/0003988 A1 * | 1/2019 | Solarz .................... H01L 22/20 |
| 2022/0120699 A1 | 4/2022 | Norman et al. |

\* cited by examiner

METHODS AND APPARATUS FOR DETECTING DEFECTS IN SEMICONDUCTOR SYSTEMS

RELATED APPLICATIONS

This application is a continuation-in-part of and claims priority to U.S. application Ser. No. 17/073,042 filed Oct. 16, 2020, which is incorporated herein by reference in its entirety.

TECHNICAL FIELD

This application relates generally to the technical field of defect detection, and more particularly, to defect detection within semiconductor systems.

BACKGROUND OF INVENTION

Today, to conform to Moore's Law (the doubling of transistor density at half the cost every 2 years), the production of high performance and highly reliable circuits has become increasingly difficult. For example, between the years 2008-2012, 22 nanometer ($1\times10^{-9}$ meter) (nm)-based memory devices and central processing units (CPUs) were created for the first time in non-compliance with Moore's Law. Key reasons for this failure were the additional cost for the added complexity of 22 nm-based devices and lack of quality and yield controls for 22 nm products. These quality and yield controls were no longer determined in the traditional well-controlled front-end of a semiconductor manufacturing line. Known front-end defect control strategies include layer by layer inspection without deep light wave penetration into an integrated circuit (IC) or IC component.

In systems prior to the advent of advanced semiconductor packaging, front-end testing such as bright field inspection and e-beam wafer inspection were enough to detect defects in the outer most layers of the IC or IC components with resolution sub 100 nm. This defect detection led to satisfactory detectability because there was not a need to penetrate deeply into the IC package and maintain high resolution. A bright field inspection microscope or e-beam tool performs defect inspection during the design/development and yield ramping phases of the semiconductor fabrication process and observes the topmost surface without penetration. During these phases, a bright field inspection or e-beam microscope can be utilized to minimize defects and enhance production yield, mainly because devices prior to 2008 were largely planar ICs built layer by layer in additive/subtractive processes that exposed the top surface to measurement by e-beam or visible optical light of the bright field microscope. Subsequently, once the defects are minimized in the yield ramping phase, the use of the e-beam or bright field inspection is reduced in order to speed up fabrication. Only in cases where the yield is disrupted does the use of the e-beam or bright field inspection return and is highly limited in its capability to detect. However, currently, the use of e-beam and bright field inspection is primarily limited to front-end fabrication of transistors and non-existent in the back-end factories (i.e., where components of an IC are assembled). The primarily limitation with bright field inspection and e-beam wafer inspection is the fact that it cannot deeply penetrate semiconductor (e.g., IC) packaging. This limitation is especially problematic with the introduction of advanced semiconductor packaging (ASP) which requires deeply penetrating light beyond the existing capability of bright field inspection and e-beam wafer inspection. In ASP, active circuit elements are buried deep within the substrate or package or even within a single chip, typically greater than 10 microns ($1\times10^{-6}$ meter) deep, and even could extend through a multitude of stacked and bonded chips or wafers in excess of 750 microns in depth. As can be seen, the depth of elements within ASP circuits makes the use of e-beam or the light of bright field inspection tremendously difficult.

ASP is a term used to refer to different processor and memory assembly techniques for increasing the overall density of a final IC and integrating one or more semiconductor chips or ICs. Techniques within ASP include but are not limited to: wafer bumping, System on IC (SoIC), fan-out wafer level package or FOWLP (their trade names such as eWLB, FOcus, and InFO), Panel Level Packaging (PLP), fan-out panel level packaging (FOPLP), fineline redistribution lines (RDL) on substrates without Si interposers (high density interconnect or HDI with imbedded bridges, or RDL on glass, other HDI printed circuit or wiring boards or PCB/PWB), Silicon via interposer, through Si-via or TSV stacked wafers, placing Chip/Chiplets on Wafer (CoW), Chip/Chiplets on Wafer on Substrates (CoWoS), Chips/Chiplets on Substrates using flip chip technology, embedded Chips/Chiplets in Substrate, and the like. An advantage of advanced semiconductor packaging is increased performance outside of the wafer front-end factory by less expensive assembly or stacking of chips in the back-end factory, which results in an increase in: overall density, bandwidth, and signal speed (lowering resistance, impedance, and capacitance and associated delay times in propagation).

Additionally, within a package (e.g., an IC package) the performance and density may be increased by removing traditional solder interconnections that join one or more circuit elements together, or making direct metal to metal electrical contact, known as using Direct Bonded Interconnects (DBI), hybrid bonding (HB), or vertical interconnect access (VIA) between components within the package. DBI may replace older solder bump technology. Here in the back-end (i.e., the assembly of all the components of an IC), the variety of assembly implementation techniques impedes the use of front-end wafer inspection tools such as e-beam and optical (bright and dark field tools) because unlike in the front-end (i.e., where components like transistors are made) there is no front-end like predictable planar wafer whose defects under test exist within 3 microns of the outer surface. Stated another way, due to the density of an IC, defect discovery in the back-end (when the components of the IC are being assembled or are assembled) requires deeper penetration than defect discovery in the front-end (when the various components of the IC are being manufactured).

In some advanced semiconductor package case, the IC active element within a chip or chiplet or within stacked chips impedes the use of traditional e-beam or optical tools. Instead, due to their impenetrability, traditional e-beam and optical tools may only penetrate an IC package less than 3 microns from the package's surface. Such impenetrability prevents detection of defects within an IC package that is deeper than 3 microns from the package's surface. A solution is provided for a method and apparatus to detect a new class of manufacturing defects in metal to metal contacts that are deeply recessed (e.g., greater than 3 microns) from any surface during assembly, and in breaks or cracks in Si or other circuit elements.

BRIEF SUMMARY

Methods, apparatuses, and systems described herein overcome the shortcoming of current defect detection techniques and make them commensurate with requirements for advanced semiconductor package penetration by combining a spatially coherent light source that penetrates the full wafer or full semiconductor package with a unique projection architecture that can hold unity magnification for any working distance between a position of a partially complete or completed device under test (DUT) to detect particular defects. Without limitation the techniques described here may be applicable in the back-end, front-end, or mid-end of line (MEOL). As discussed in more detail below, the techniques described herein allow for the determination of minor submicron cracks within the smallest of solder joints down to feature size of 0.5 microns to 25 microns in diameter, cracks of critical dimensions in Si die, material layers of the substrate, and direct metal to metal DBI or hybrid bonds of <1 micron in length or width or height. Furthermore, techniques described herein allow for the detection of cracked or separated copper traces/interconnections bonded without solder (which may be referred to as DBI or hybrid bonding). While specific techniques to produce spatially coherent source photons and unity magnification invariance are described below, techniques described herein meet the requirements for both source array compatibility and working distance to successfully enable the detection defection in condensed ICs.

In addition, techniques described herein allow for an apparatus/system that has unique physical dimensions of L×W×H, which are nonexistent today. Said apparatus/system enables many characteristics that differentiate from traditional technologies that produce deeply penetrating radiation. In one embodiment, a first characteristic is a compact size of L×W×H that also allows for array formation at a light emitting source to uniformly cover a whole wafer or panel in a single exposure or shot. Array sizes of 1×1 out to 100×100 units may be realized with an overall footprint of 1 m×1 m×1 m (L×W×H). In one embodiment, a second characteristic is a critical working distance between device under test and detector of 10 mm to 1 meter to execute one or more measurements of electronic signals. The second characteristic may be achieved as a result of the first characteristic. For example, due to the compact size of the apparatus/system a critical working distance may be achieved within a 3 m×3 m×3 m closed environment. Traditional deeply penetrating light sources in existence today do not enable these two characteristics and are typically not able to physically fit into a closed environment with the dimensions of 3 m×3 m×3 m, which may be a size of a hallway in a back-end factory.

In one embodiment, a defect detection method, apparatus, and system is presented comprising a light emitting device that outputs a light beam capable of penetrating a device under test at least to a first depth, wherein the light beam, upon initial output, comprises spatially coherent light waves. The system further comprises a video detection chain that transforms light waves that were incident on the device under test into visible optical light. The video detection chain further generates, based on the visible optical light, an electronic map indicating one or more defects within the device under test. The video detection chain further generates, based on the visible optical light, a first electronic map indicating one or more concentrations or distributions of elements within the device under test. The video detection chain further generates, based on the visible optical light, a second electronic map indicating one or more: units of length, area, volume, or physical gauges within the device under test. The video detection chain further outputs at least one of the first or second electronic maps. In one embodiment, the first and second electronic maps may be a single electronic map containing information from the first electronic map and the second electronic map.

In one embodiment, the video detection chain is displaced at least 10 millimeters away from the device under test. In one embodiment, the light emitting device comprises an incoherent light source and a light source attachment, wherein the incoherent light source has dimensions that do not exceed 50 millimeters×50 millimeters×50 millimeters.

In one embodiment, the first depth is 1 micron. In one embodiment, the first depth is 725 microns.

In one embodiment, the light source attachment comprises a monocapillary or a polycapillary. In one embodiment, the light source attachment comprises a thin film waveguide.

In one embodiment, the video detection chain generates the electronic map based at least in part on attenuation and phase coherence disturbances associated with the light waves that were incident on the device under test. In one embodiment, the light emitting device comprises an X-ray and the one or more defects comprises of gaps or cracks within the device under test.

In one embodiment, a defect detection method, apparatus, and system is presented comprising a light emitting device that outputs a light beam capable of penetrating a device under test at least to a first depth, wherein the light beam, upon initial output, comprises spatially coherent light waves. The system further comprises a video detection chain, the video detection chain is displaced between 10 millimeters and 1 meter away from the device under test. The video detection chain further receives, based at least in part on light waves that were incident on the device under test, an image of at least a portion of the device under test, wherein the magnification of the size of the image is in unity to the size of the portion of the device under test. The video detection chain further, based on the image of at least the portion of the device under test, generates an electronic map indicating one or more defects within the device under test. The video detection chain further outputs the electronic map.

In one embodiment, the light emitting device comprises an incoherent light source and a light source attachment, wherein the incoherent light source has dimensions that do not exceed 50 millimeters×50 millimeters×50 millimeters.

In one embodiment, the light emitting device comprises an incoherent light source and a light source attachment, wherein the incoherent light source has dimensions that do not exceed 50 millimeters×50 millimeters×50 millimeters and the light source attachment has dimensions that do not exceed 200 millimeters in length and 50 millimeters in diameter.

In one embodiment, the electronic map indicates a chemical composition of one or more material layers within the device under test. In one embodiment, the electronic map indicates one or more of the following: a length of one or more portions of the device under test, an area of one or more portions of the device under test, a size of one or more portions of the device under test, or metrology of one or more portions of the device under test.

Before explaining example embodiments consistent with the present disclosure in detail, it is to be understood that the disclosure is not limited in its application to the details of constructions and to the arrangements set forth in the following description or illustrated in the drawings. The disclosure is capable of embodiments in addition to those described and is capable of being practiced and carried out in various ways. Also, it is to be understood that the phraseology and terminology employed herein, as well as in the abstract, are for the purpose of description and should not be regarded as limiting.

These and other capabilities of embodiments of the disclosed subject matter will be more fully understood after a review of the following figures, detailed description, and claims.

It is to be understood that both the foregoing general description and the following detailed description are explanatory only and are not restrictive of the claimed subject matter.

DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
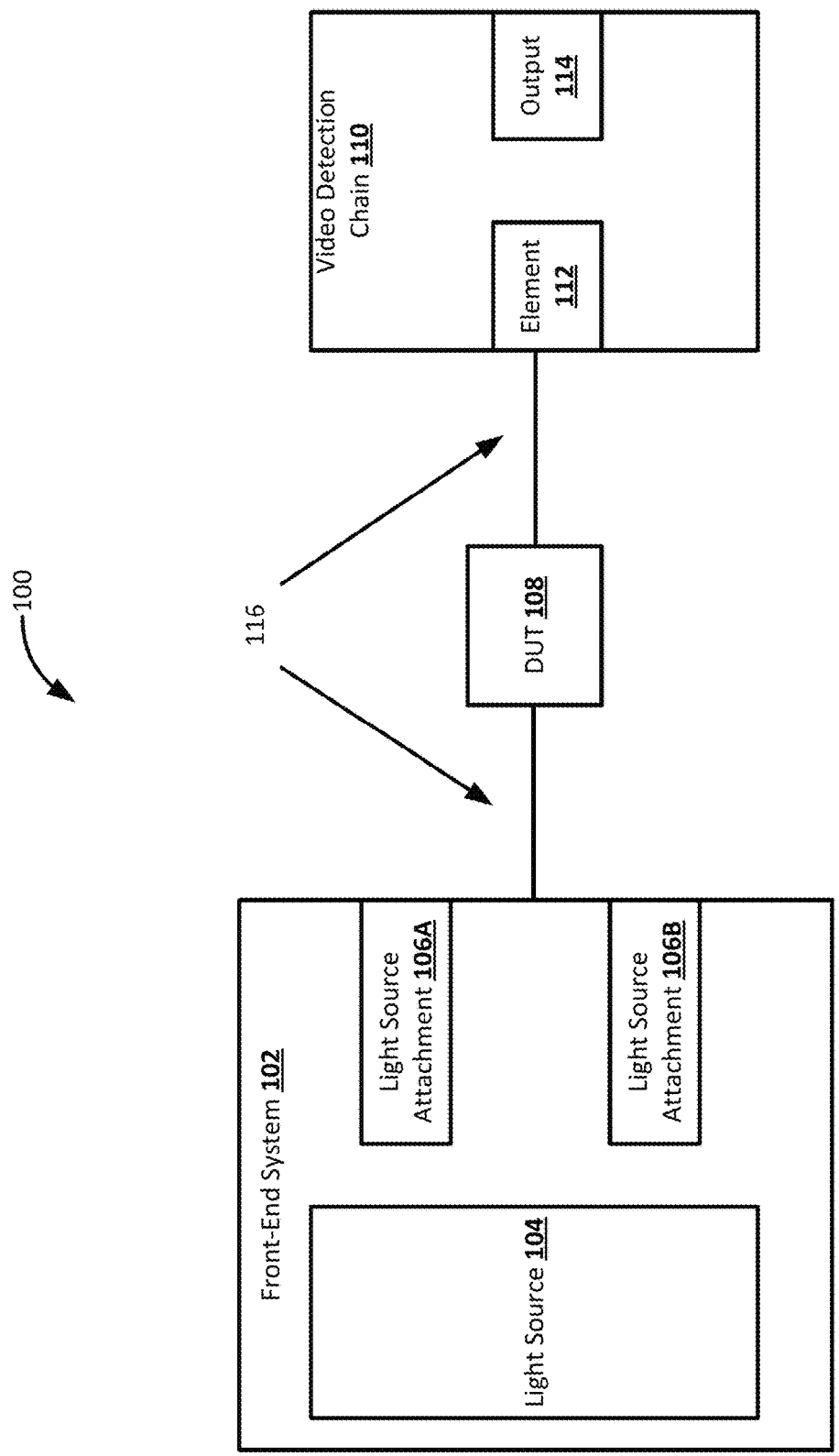
FIG. 1 illustrates a system in accordance with one or more embodiments described herein.

Techniques described herein may be used at least to inspect and accurately determine the physical existence, position, or size metrology of defects within (1) metal interconnections serving as an electrical connection using a microbump or direct hybrid bond metal trace between chip or chiplet (large scale integration (LSI) logic or Memory Chip) to silicon (Si) interposer or other form of redistribution lines (RDLs) within chip or supporting advanced package substrate such as RDL on glass, RDL on organic high density interconnect (HDI) board, or RDL on printed circuit/wiring board (PCB/PWB) with critical dimensions in the range of 0.1 microns to 5 microns; (2) semiconductor wafer level or panel level packaging for cracks in metal interconnections, both direct metal to metal hybrid bonds and multilayer microbumps in the range of 0.5 microns to 25 microns in critical dimension (length×width or diameter); (3) RDLs and metal plated microvias in various substrates such as HDI boards, embedded boards, hybrid ceramic boards, printed circuit or wiring boards (PCB/PWB), and/or multiplayer system in package (SiP) substrates; (4) microbumps connected to holes plated through silicon vias (TSVs) on Si chip or Si Interposer or embedded Si components like a Si bridge in organic sub state, or within a buildup layer within the copper (Cu) plated vias or through holes in the organic or inorganic substrate; (5) solderless metal to metal connections such as DBI or hybrid bonding in Advanced Semiconductor Packaging; and (6) any other defects or undesirable characteristics within an IC package, component, and/or interconnect between components regardless of the depth or density of said IC package or component.

The premise for finding cracks, gaps, or other defects in metal interconnects, Si, or organic and inorganic substrate layers, microvias, and/or microbumps, is to pass finite spatially coherent light waves through a device under test (DUT). In the DUT, a defect such as a gap or crack, will cause a phase shift in light wave front and upon subsequent physical propagation length develop Fresnel fringe interference patterns that quantify the existence, position coordinates, and the physical extent of the defect. These interference patterns can be described as constructive and destructive interference between perturbed portions of the wavefront and unperturbed portions of the wavefront. Interference is detected by allowing the light waves that exit the DUT to propagate at least a certain distance to a first element (e.g., a scintillator, photocathode, direct semiconductor conversion material, flat panel detector, Cadmium Telluride (CT) or Cadmium Zinc Telluride (CZT) camera) of a video detection chain.

The Fresnel fringe may be proportional to the second derivative of the phase shift in the light waves exiting the DUT. In one embodiment, the light waves, after exiting the DUT, will propagate and develop at a distance of 10 mm to 1 meter. Within this distance, a first element of a video detection chain may be placed in order to accurately determine the Fresnel fringe of the detected light waves. A phase coherent light source interacting with a defect causes Fresnel fringe interferences and these interferences can be elegantly detected in light waves without complicated optical techniques and equipment (e.g., without gratings, monochromators, multi-wave pass parabolic mirrors, partially transmissive optics, Fresnel zone-plates, interference interferometers systems in general, and the like). For example, Fresnel fringe interfaces may be detected with a first element that may consist of the components detailed herein. A unique feature of this disclosure is the use of a light that deeply penetrates through the full ASP allowing for defect detection deep (e.g., greater than 3 microns from the surface of the IC package) within the DUT and its corresponding package.

Moreover, electronic maps may be generated that indicate phase shifts or fringe interference patterns. The electronic map may visually indicate x, y, and z coordinates/positions of one or more defects, their existence for counting, and their physical size to deliver a continuous metering or metrology. By generating electronic maps, the burden of human interpretation of computer data points (e.g., Fresnel fringe interferences and calculations of Fresnel fringe interferences), along with limited human perception to gray scale is avoided by the automation of the defect detection using a highly sensitive video detection chain in tandem with automated algorithmic routines based on phase shifts and changes to interference fringes.

FIG. 1 illustrates an example defect detection system 100 for detecting one or more defects in a DUT. Defect detection system 100 comprises of front-end system 102, DUT 108, and video detection chain 110. Front-end system 102 comprises of an incoherent light source 104 and one or more light source attachments 106A and 106B. Although two light source attachments are depicted, it is within the scope of this disclosure to have one or more light source attachments. Moreover, incoherent initial light source 104 can be arrayed by, for example, light source attachment 106A and result in a 1 to 1 illumination of the entire wafer, panel, or substrate, in a single shot or exposure. The wafer, panel, or substrate may be DUT 108 or a component of DUT 108. The L×W×H is sufficiently small to construct an uninterrupted, large area, uniform in intensity profile, uniform to less than 10% across the full size, and typically can be an array of 1×1 out to 100×100 sources to cover existing 300 mm wafers or 650 mm×650 mm panel substrates. In one embodiment, the L is a length, W is a width, and H is a height, and each may be between 10 mm to 500 mm.

Light source 104 may be any light source capable of producing one or more light waves. In one embodiment, an unmodified light source 104 (i.e., a light source without light source attachments) may produce incoherent light waves that are capable of fully penetrating DUT 108. An incoherent light wave may be a non-spatially coherent light wave. In one embodiment, an incoherent light wave may also be a non-temporally coherent light wave. In one embodiment, light source 104 may be an X-ray machine, such as a traditional point project system for Computed Tomography (CT) X-ray. In one embodiment, light source 104 may be a traditional incoherent light source such as a fine-focus X-ray tube with a spot size in the range of 0.1 microns to 200 microns. The fine-focus X-ray tube may be an actively pumped fixed tube, a completely sealed fixed tube, or a rotating anode. Regardless of the tube type, the traditional incoherent light source may emit light in a broad range of angles and wavelengths that are deeply penetrating (e.g., from 0 degrees to 90 degrees beam half angle) and with a power level between 1-10,000 Watts.

It is known to those well versed in the art of X-ray physics and X-ray optics that X-rays are capable of producing deeply penetrating light when charged particles are accelerated/deaccelerated. The most common sources of incoherent and deeply penetrating light include, but may not be limited to, a rotating anode source, fine-focus sealed tubes of various forms, plasma impinging on a metal, pulsars from crab nebulae, free electron lasers, synchrotrons, betatrons, cyclotrons, and LASER Wakefield sources. In general, 2D, 3D CT X-ray sources that are used in commercial settings such as the medical field, primarily produce incoherent broadband radiation that is produced by accelerating a beam of electrons from a hot filament (e.g., the cathode) to a metal target (e.g., the anode). The metal target may take the form of a transmission film or a wedge of solid, comprised typically of Tungsten, Molybdenum, Silver, and Copper. Traditional X-ray sources are often operated at typical acceleration voltages in the range of 40 keV-160 keV (known as the generator voltage) for full penetration probing.

In most cases, the penetrating light produced by the X-ray source is completely incoherent in space and time. If you place two metal lines of thickness 0.5*d in physical overlapping contact using a cross pattern, an interconnect region of interest will form an interconnect with a total thickness of d. The resulting absorption of incoherent X-rays passing through the interconnect region of interest is described by Beer's law, yielding only the change of intensity for a unit of measure. And if one were to separate the two overlapping lines by a small air gap, for example, <1 micron in physical thickness (consider this an approximation for a crack or gap that creates a true electrical open measuring resistance greater than 1 megaΩ of direct current), the resulting attenuation of the X-ray intensity shows no difference compared to the direct contact case when utilizing deeply penetrating light that is incoherent because air doesn't attenuate in a significant manner (e.g., it takes 50-100 cm of dry air to make a 1% change in intensity of typical X-rays due to the low density of air). This illustrates the key issue with traditional X-ray inspection of cracks and gaps utilizing only their deep penetrating properties: there is no unique manner to discern the gap because it is small and leads to an imperceptible change to the overall attenuation for hard X-rays of any keV energy value for traditional X-ray sources. Stated another way, an X-ray, due to producing spatially and temporally incoherent light, cannot accurately indicate whether there is an opening or gap in a metal component, such as a solder joint or solderless joint within semiconductor packaging.

To achieve spatial coherence of light emitted from light source 104, one or more light source attachments 106A and 106B are utilized. A light source attachment may be comprised of one or more of: a capillary, polycapillary glass, or metal coated glass tube (comprised of elements such as Gold, Chromium, Molybdenum, and their combinations for improved reflectivity, improving total external reflection for deeply penetrating light). It should be noted that the light source attachment does not need to physically attach to light source 104, but instead it may be attached in the sense that the light source attachment 106A and/or 106B is able to receive at least a portion of emitted light waves from light source 104. The light source attachment effectively moves the source away to an infinite distance, or in other words has collimating properties for deeply penetrating light.

Figure 6A:
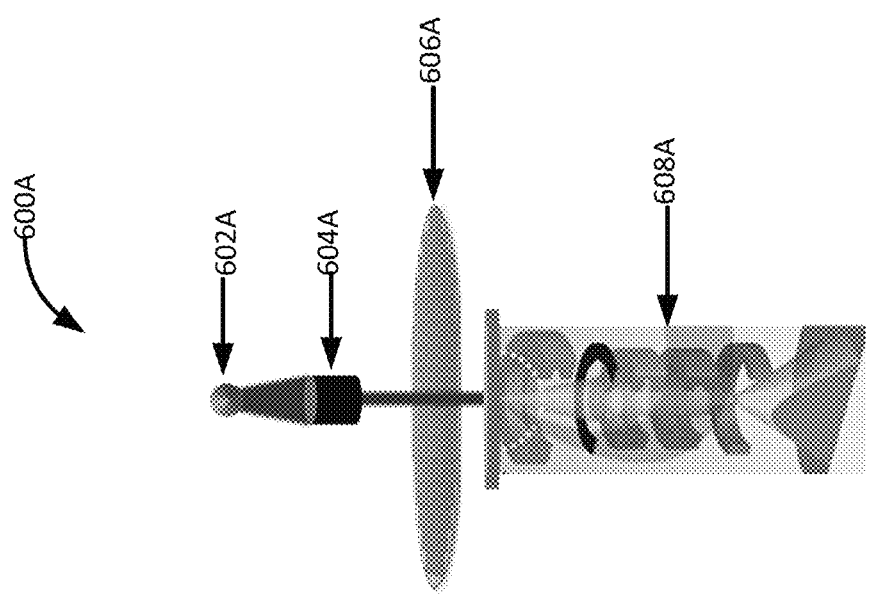
FIG. 6A illustrates a system in accordance with one or more embodiments described herein.
Figure 6B:
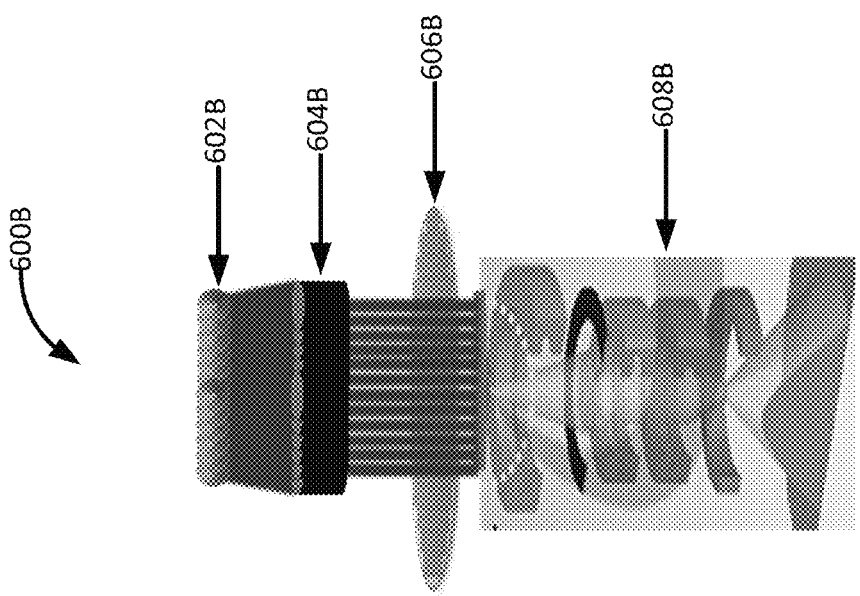
FIG. 6B illustrates a system in accordance with one or more embodiments described herein.

With brief reference to FIGS. 6A-6B, defect detection systems 600A and 600B are depicted. Defect detection system 600A is an example of a defect detection system comprising a single light source 602A and a single light source attachment 604A that is used to inspect wafer 606A (i.e., a DUT) utilizing video detection chain 608A. Single light source 602A and single light source attachment 604A form a 1×1 light beam to inspect wafer 606A. In contrast, defect detection system 600B is an example of a defect detection system comprising multiple light sources 602B with multiple light source attachments 604B that are used to inspect wafer 606B utilizing video detection chain 608B. Multiple light sources 602B and multiple light source attachments 604B form an N×N element light beam to inspect wafter 606B. In such an embodiment, N is greater than 1 and represents the number of light elements making up the light source 602B and/or the number of multiple light source attachments 604B. For example, there may be 100 light sources and an equal number of light source attachments that form a 100×100 light element in the beam. In another example, there may be a single light source and 10 light source attachments that form a 10×10 light element in the beam. By increasing the number of light sources and/or number of light source attachments a wider beam may be used to inspect a greater area of a DUT.

Figure 2:
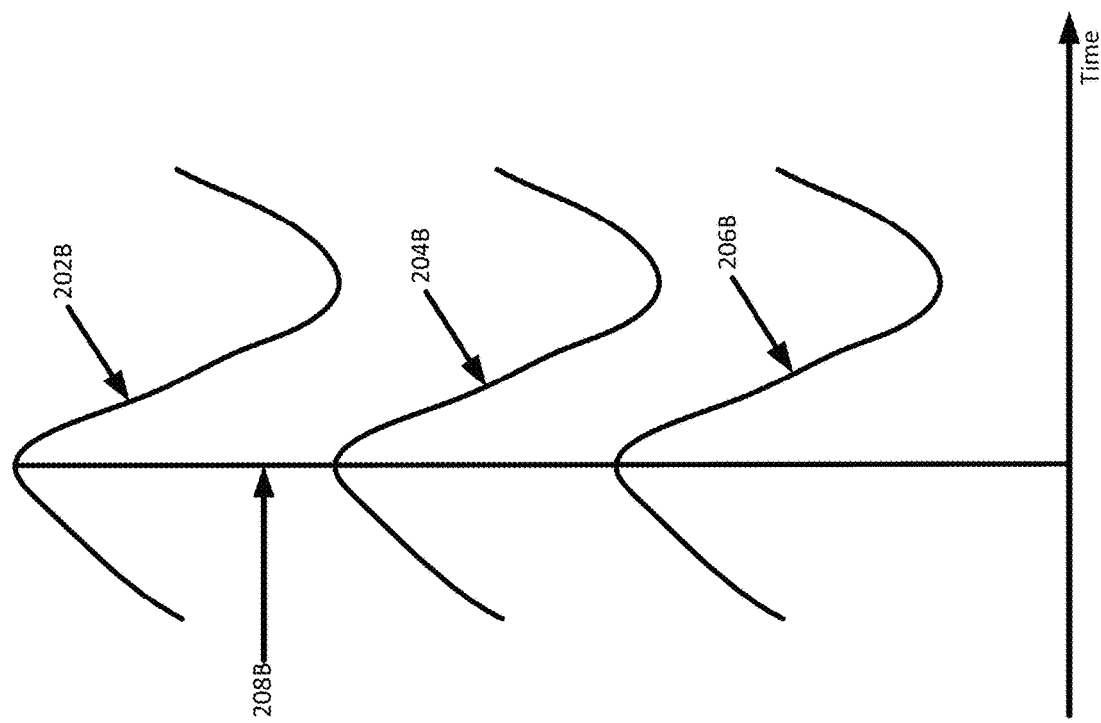
FIG. 2 illustrates an example conversion from incoherent light waves to spatially coherent light waves in accordance with one or more embodiments described herein.
Figure 2:
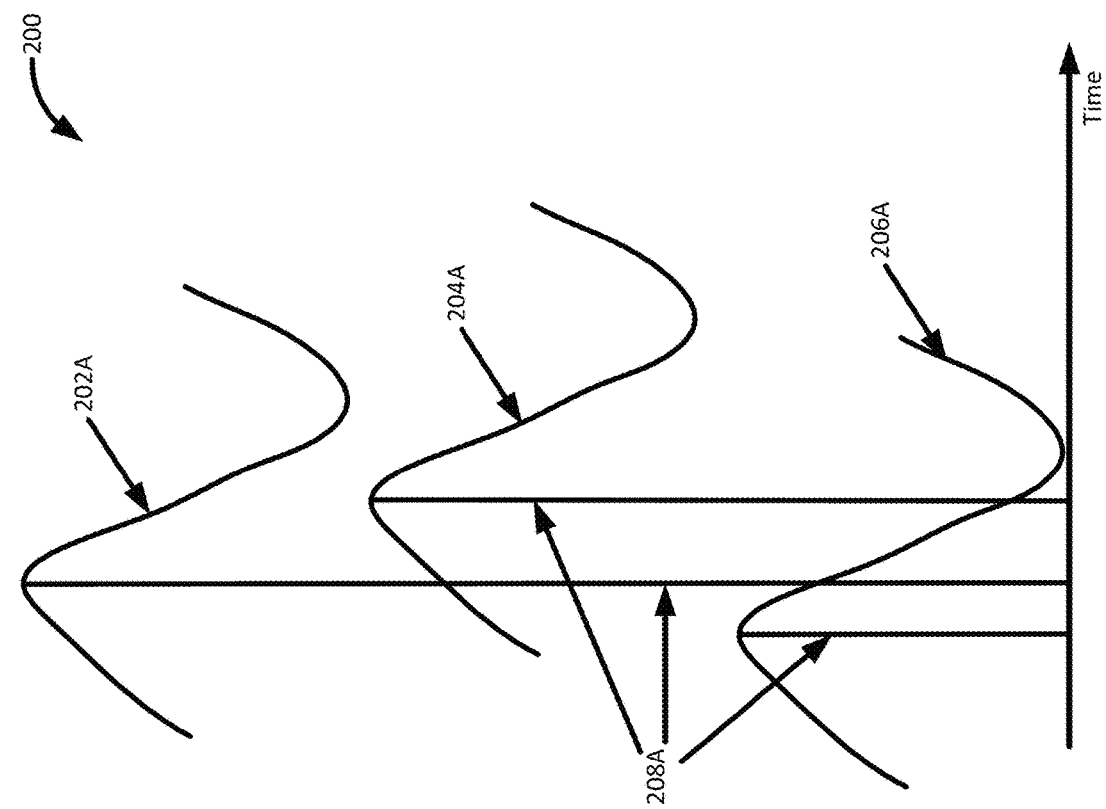

With returned reference to FIG. 1, in one embodiment, the light source attachment may be a capillary and the combination of the physical dimensions and the materials making up the polycapillary, such as the diameter of the overall polycapillary and the individual diameters of fibers/tubes making up the amalgam or overall light guide, and the physical materials making up the polycapillary typically, but not limited to, borosilicate glass, or pure metals mentioned herein above, or combinations of these metal coated glass fibers or tubes, effectively reduces the large beginning angular range of emission (e.g., typically +/−15 degrees to +/−90 degrees for beam half angles) to a narrow range that is between 1.3 to 2 times the critical angle for total external reflection. This effective narrowing is brought about by the multiple glancing bounces that the deeply penetrating light takes within the polycapillary or guide. For the energies of penetrating light of interest, this may result in <5 milliradian angles or <0.3 degrees for exiting divergence angles. Additionally, this narrowing of angular emission introduces a significant intensity gain improving the detection capability 100-1000 times thus enabling the method taught herein, and in direct proportion to the angles between the entrance and exit of the light guide. The light source attachment due to this narrowing of the divergence angles and effective movement of the light source 104 to an infinite distance away, converts the incoherent light from the light source 104 into spatially coherent light gained through multiple bounces described above. This narrowing of divergence angles further establishes a coherent wavefront throughout the exiting light waves (of the light source attachment) of deeply penetrating capability (i.e., the phases between neighboring light waves emitted from the light source become aligned over the length of the light source attachment (e.g., a polycapillary and coherent)) as shown in FIG. 2. A further advantage of the disclosure is the ability to array 1×1 to 100×100 light sources together because each light source attachment (e.g., polycapillary) can be made sufficiently small from <1 mm to 10's of mm for each overall light source attachment diameter and stacked side by side. Stacking light source attachments side by side enables formation of a highly uniform singular beam, the overall cumulative size of which is a single substrate for advanced semiconductor packaging, such as but not limited to, overfilling the entirety of a 300 mm wafer or 650 mm×650 mm panel for single shot inspection. Stated another way, the ability to array 1×1 to 100×100 light sources together enables the creation of a singular large beam, by one or more light source attachments, of customizable size, which then can be used to inspect a portion of a DUT or the entirety of DUT in one shot. In one embodiment, the combination or integration of a light source with a light source attachment may be referred to collectively as a light emitting device.

With brief reference to FIG. 2, light waves 202A, 204A, and 206A represent spatially incoherent (i.e., incoherent) light waves emitted from, for example, light source 104 of FIG. 1. Light waves 202A, 204A, and 206A are spatially incoherent with respect to each other as indicated by peak amplitude line 208A. After, light waves 202A, 204A, and 206A are passed through, for example light source attachment 106A or 106B of FIG. 1, spatially coherent light waves 202B, 204B, and 206C are produced. As can be seen, light waves 202B, 204B, and 206C are in-phase (i.e., spatially coherent) as indicated by peak amplitude line 208B. As shown by peak amplitude line 208B the amplitudes of light waves 202B, 204B, and 206B are aligned, which means given that light waves 202B, 204B, and 206B have the same spatial frequency or whole number multiple of the frequency where the peaks and the valleys align and it is said they are in-phase and have spatial coherence.

Now with returned reference to FIG. 1, the light source attachment collimates the incoherent light from light source 104 by generating multiple bounces within the inner walls of the respective light source attachment as described above. The light source attachment captures, from light source 104, a narrow portion of the emitted incoherent light called the capture angle. The capture angle may be defined by properties of the light source attachment, such as, radius of curvature or the relationship between overall diameter to the input focal length of the source attachment(s). Deeply penetrating light that arrives in a range from zero to twice the critical angle for total external reflection may be captured, and may subsequently propagate or transmit through the light source attachment(s) and exit with a narrow angular divergence as defined above <5 milliradians. In one embodiment, the light source attachment(s) catch(es) between 1-10% of the incoherent light (depending upon the energy of the deeply penetrating light waves and an angle of incidence) emitted from light source 104. The light source attachment collimates received incoherent light source waves and transmits a beam comprising of phase coherent waves having a cross-sectional diameter in the range of 0.1 mm to 10's of mm per light source attachment. Additionally, a multiplicity of light source attachments may be located side by side, stacking or joining to overlap the exiting beam elements (of each light source attachment) to form a singular wide area coherent beam in the range of 10's to 100's of mm. As a result of attaching a light source attachment to light source 104, a portion of the emitted incoherent light waves may be collimated into phase coherent light waves (i.e., a beam) and subsequently combined between multiple light source attachments to combine multiple beams to enable a large area, uniform singular master beam with a sufficiently compact overall physical envelope (e.g., L×W×H can take values in the range of 10 mm to 1000 mm) necessary to accommodate working distances necessary for the methods described below, typically 10 mm to 1 meter between source (i.e., light source 104 and/or light source attachments 106A, 106B) and detector (i.e., video detection chain 110).

The description above uses the term "the light source attachment" to refer to either exemplary light source attachment 106A or 106B. Both light sources may operate independently or in tandem to provide one or more sets of coherent light waves (i.e., beams). The benefit of increasing to large diameters of phase coherent light can be applied to the phase sensitive methods taught herein to acquire the largest image in a single shot without having to scan or move the physical DUT, inclusive the entire wafer or panel, and minimize or remove scan time overhead (e.g., stage move time and stage settle time), while minimizing image correction and stitching artifacts between multiple small images or small field of views; improving detectability without blind spots or areas of exclusion. In one embodiment, multiple light source attachments (e.g., light source attachments 106A and 106B) may be simultaneously attached to light source 104 in order to multiply the physical cross-section of the collimated light waves to a total diameter in a range of 10 mm to 50 mm. In such an embodiment, there may be four light source attachments provided, each of which captures a different 5% portion of incoherent light being emitted from light source 104.

In one embodiment, one light source is attached to one or more light source attachments to achieve a total beam diameter of 10 mm to 50 mm with spatial phase coherence. The beam may be formed into an N×N array of arrayed light guides, where N can be 1 to 100, but not limited to 100. In the case of 100×100 array with 10 mm diameter exit the beam from each light source attachment yields an effective area 1000 mm by 1000 mm in size with uniform illumination of phase coherent light.

Figure 7:
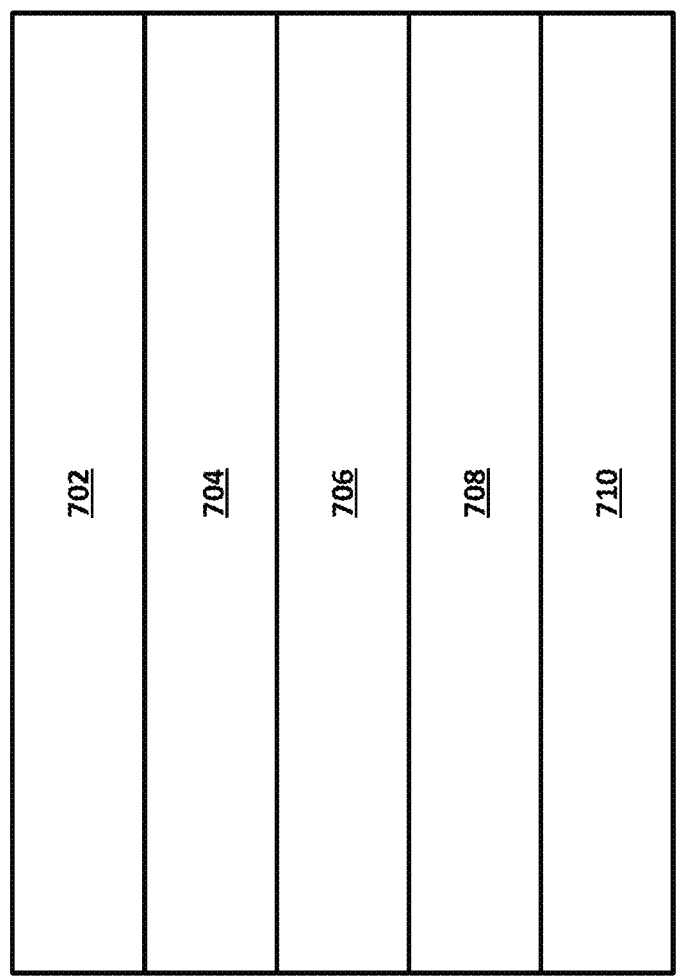
FIG. 7 illustrates a light source attachment in accordance with one or more embodiments described herein.

With brief reference to FIG. 7, FIG. 7 depicts an example thin film waveguide 700 that may be implemented as light source attachment 106A and/or light source attachment 106B. Thin film waveguide 700 may comprise substrate layers 702 and 710 and inner layers 704-708. In one embodiment, inner layers 704-708 may be thin layers that have a height of between 1 nanometer to 100 nanometers. Inner layers 704-708 may be comprised of Cobalt and Silicon, Nickel and Silicon, Cobalt and Carbon, or Nickle and Carbon. In one embodiment, substrate layers 702 and 710 may be comprised of Gallium arsenide (GaAs). Incoherent light from light source 104 may be incident upon layer 702 or 710 of thin film waveguide 700. The incident light may be absorbed by the layers within thin film waveguide 700 and translated into a single beam comprising of spatially coherent light waves. Moreover, one or more layers 702-710 may be repeated along a horizontal axis in order to guide a plurality of light waves singularly in spatial phase coherence that can be summed together to form a large area beam with a single phase and an extremely low divergence of less than 5 milliradians. Layers 702-710 can also be repeated in a vertical direction, in other words, forming a 2-dimensional repeating structure in horizontal and vertical directions, and stitching a larger beam with dimensions with respect to the horizontal and vertical axis of 50 mm×50 mm, respectfully, singularly in phase and with an extremely low divergence angle of less than 5 milliradians. In one embodiment, each layer within thin film waveguide 700 may absorb in the range of 5-10% of incident light, which enables a way to transfer a significant portion of the incident incoherent beam into a singular coherent beam with greater than 70% of the initial intensity. Furthermore, thin film waveguide 700 can give an intensity gain factor in direct proportion to the incident angular divergence of the beam in a ratio to exiting divergence of the beam. For example, and not limited to, 45 deg incident divergence and 1 mrad exit divergence of the phase coherent beam results in the intensity gain of 789 times (45 deg/0.057 deg). In short, the repeating layers within thin film waveguide in the horizontal and vertical directions enables N light sources (for example, 10) because the small dimension of the light source (e.g., 50 mm×50 mm×50 mm) enables high density stacking or arraying, and the waveguide can absorb the incoherent beams, sum them efficiently, and translate them into a cumulative singular beam comprising of phase coherent light waves that is effectively collimated and in singular phase with N times the power for phase coherent defect inspection or metrology measurement purposes.

The spatially coherent light waves produced by the light source attachment penetrate through DUT 108 and are detected by element 112 of video detection chain 110. DUT 108 may be a semiconductor wafer or advanced semiconductor package comprising a plurality of components, partially or fully fabricated. A component may be any part of a semiconductor device or integrated circuit or application processor chip including memory, or advanced semiconductor package, including but not limited to: bumped wafer, System on IC (SoIC), fan-out wafer level package or FOWLP such as eWLB, FOcus, and InFO, or a Panel Level Packaging (PLP), fan-out panel level packaging (FOPLP), fineline redistribution lines (RDL) on substrates without Si interposers (high density interconnect or HDI with imbedded Si bridges, or RDL on glass, other HDI printed circuit or wiring boards or PCB/PWB), Si interposers such as through Si-vias or TSV stacked wafers, Chip/Chiplets on Wafer (CoW), Chip/Chiplets on Wafer on Substrates (CoWoS), Chips/Chiplets on Substrates using flip chip BGA technology, embedded Chips/Chiplets in Substrate, and the like. The light waves detected by element 112 are utilized by video detection chain 110 to determine one or more defects (e.g., submicron defects including but not limited to cracks, breaks or gaps in metals, Si die, and the substrate organic materials) in one or more components of DUT 108.

In one embodiment, defects may be detected by monitoring the light wave attenuation and the phase coherence disturbances or changes in the light wave coherences received at element 112. The phase changes in light waves incident on DUT 108 may be referred to as changes in phase coherence or phase coherence disturbances. These changes in phase coherence arise from coherent light encountering the air gaps comprised of, for example, breaks or cracks in the material under test. The propagating light waves that don't interact with the gaps travel undisturbed and those that do interact the cracks undergo disturbances due to small deviations in the index of refraction presented by the air gap or crack. Subsequently, the overall interference between undisturbed and disturbed light waves generates the changes in phase coherence image. In other words, when a light wave with phase coherence is exposed to a defect, such as a crack, phase coherence may be partially lost or altered resulting in a phase shift that can be measured as phase angle difference between disturbed and undisturbed light waves. Phase angle differences can be derived from Fresnel fringe interference patterns which represent constructive and destructive fringes or light or dark patterns of the resulting disturbed light waves (i.e., the light wave that has been exposed to the defect). Subsequently, the disturbed light waves are exposed to element 112 (e.g., a light wave sensitive film or light wave sensitive detectors (e.g., a scintillator, photocathode, charged-coupled device (CCD), Cadmium Telluride (CT) or Cadmium Zinc Telluride (CZT) camera, complementary metal oxide semiconductor CMOS imager, scientific complementary metal oxide semiconductor (sCMOS) imager, or flat panel display (FPD) detector)). The perturbation in the constructive and destructive fringes or measure of the changes in the phase angle (i.e., the light or dark pattern disturbances) may indicate cracks in metals, cracks in Si die, or cracks or delamination in organic/inorganic substrates, or cracks in solder microbumps, broken elements in the semiconductor wafers, and broken elements in advanced semiconductor packaging of all types, or conventional RDL or solder joint defects such as voids, noncontact opens, nonwets, solder bridge/shorts, solder extrusion, missing solder joints, or aberrant solder joint diameters. In one embodiment, video detection chain 110 is a light wave detector.

Figure 3:
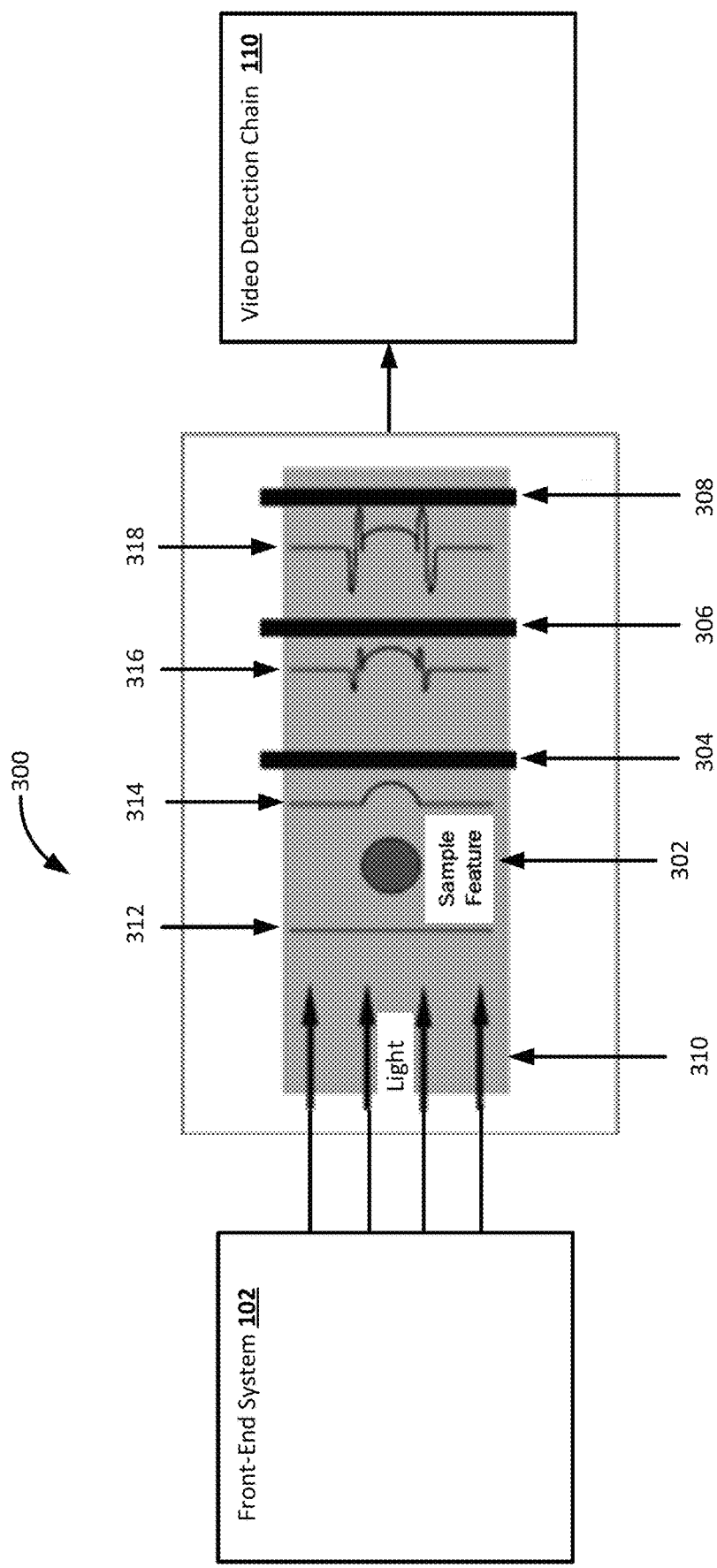
FIG. 3 depicts an example of spatially coherent light waves interacting with a component of a DUT in accordance with one or more embodiments described herein.

Now with brief reference to FIG. 3, FIG. 3 illustrates propagation-based imaging system 300 which depicts an example interaction between spatially coherent light waves and a defect with DUT 108. Here the defect 302 is depicted as a round feature and represents a metal feature (e.g., wafer, interconnect, and the like) with submicron cracks in the perimeter or the physical defect under test. The incoming phase coherent light wave front is depicted by light waves 310. Vertical straight line 312 represents a high spatial coherence between light wave fronts in light waves 310 (i.e., all light wave fronts in phase with the same phase angle). After light waves 310 deeply penetrate through defect 302, light waves 310 immediately afterwards are in phase (i.e., same phase angle), at vertical attenuated line 314, and appear merely attenuated in signal intensity where defect 302 has caused attenuation. The cracks in the perimeter of defect 302 may be undetectable by the attenuation, but with the additional propagation distance (e.g., after distance 304) begin to show their disturbance on the overall phase coherence by setting up Fresnel fringes depicted as an up/down ringing signal in the wavefront as shown by vertical lines 316 and 318. These Fresnel fringes will only setup in an efficient manner when the working distances are in the range of 10 mm to 1 meter (e.g., after distance 304) or in other words, with too short a distance, such as <10 mm (e.g., less than distance 304), the Fresnel fringes won't be detectable, while too long a distance, such as greater than 1 meter (e.g., greater than distance 308), the Fresnel fringes will wash out and not be detectable. An advantage of the disclosure herein is the compact source size (e.g., light source) and source attachments (e.g., light source attachments) enabling the ability to array a large master beam that can be placed in close proximity to a DUT and detector (e.g., video detection chain) to optimally detect Fresnel fringes and maintain unity magnification for imaging.

With returned reference to FIG. 1, element 112 of video detection chain 110 converts the light waves transmitted through DUT 108 into an image for display on a computer screen, mobile phone screen, and the like. The image may be a digitized shadow or "shadow-gram" indicating an intensity of a partially attenuated amplitude of the light waves caused by interaction with material layers (e.g., metals) and one or more defects in DUT 108. The "shadow-gram" may further indicate wavefronts that have varying phase coherence characteristics caused by interaction with edges of the material layers (e.g., metals) or one or more defects within (such as cracks, breaks, and air gaps encountered within the elements in a wafer or advanced semiconductor package, such as direct metal to metal bonds (DBIs) using Cu filled vias, metal traces or redistribution lines (RDLs), Hybrid bonding contacts using Cu vias or direct metal pad to metal pad, Cu plated microvias, plated through silicon vias (TSVs), and/or solder microbumps). The "shadow-gram" may be a grayscale image for all the deeply penetrating light or a color image representing different elements over a limited range of energies for deeply penetrating light (e.g., five color types representing X-rays in the ranges of <20 keV, 20 keV-25 keV, 25 keV-30 keV, 30 keV-35 keV, >35 keV, mapped to the elements highly absorbing in these ranges, respectively). In one embodiment, the element 112 may be a scintillator or a photocathode. The scintillator may upconvert to longer wavelengths of the received light waves from X-ray light waves to uv visible optical light followed by an indirect conversion to electronic signals (e.g., sCMOS or CCD camera). Whereas, the photocathode coverts the wavelengths of received light waves from light waves to secondary electrons with a narrow energy range of less than 0.5 eV for the mean energy and the energy spread. In one embodiment, element 112 may be a flat panel detector or a CZT camera that directly converts the wavelengths of the received deeply penetrating light waves directly from light waves to electronic signals. In another embodiment, element 112 is a photocathode connected to an electron micro channel plate (MCP), and/or phosphor screen, and then the photocathode is further connected (directly or indirectly) to a sCMOS, CMOS, or CCD camera, or an X-ray image intensifier tube to a sCMOS, CMOS, or CCD camera.

Figure 8:
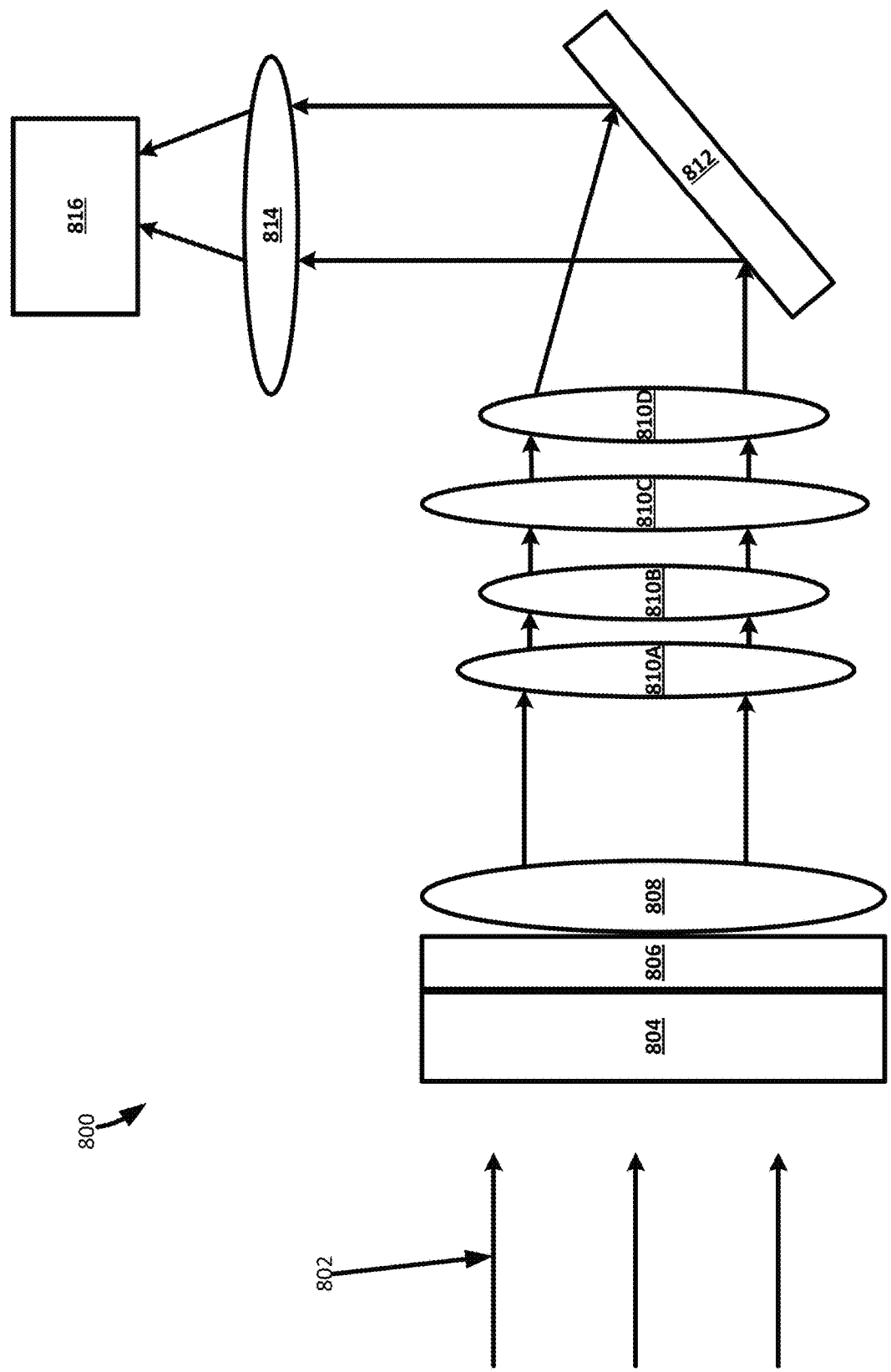
FIG. 8 illustrates a video detection chain in accordance with one or more embodiments described herein.
Figure 9:
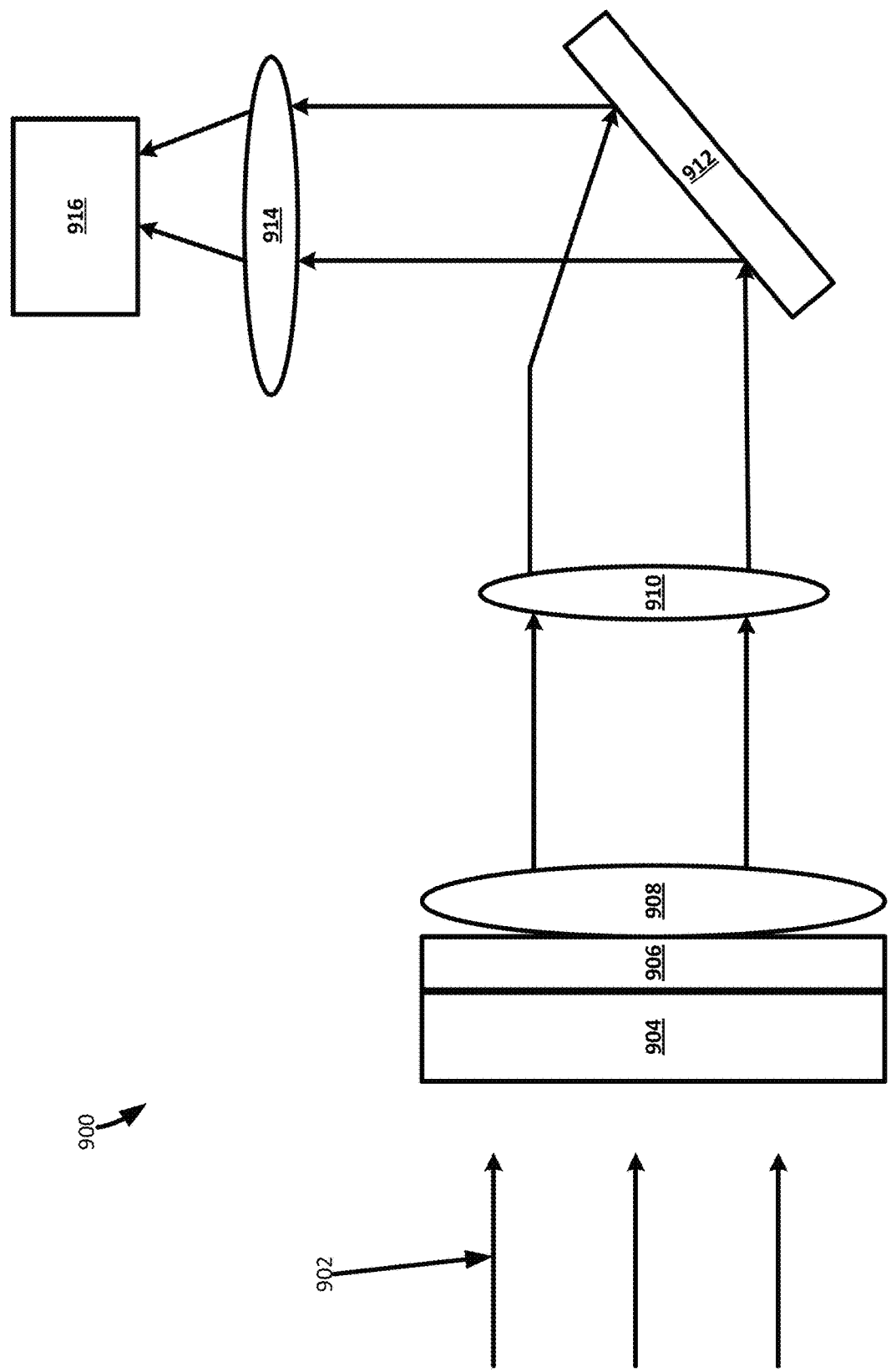
FIG. 9 illustrates a video detection chain in accordance with one or more embodiments described herein

FIGS. 8-9 depicts video detection chain 800 and video detection chain 900. Both video detection chains are optical video chains and may be used to identify defect failures or variations in fabrication processes or assembly processes in semiconductors and may be implemented as video detection chain 110. The video detection chain may be located in various places including a failure analysis lab, at line beside production manufacturing equipment such as a foundry or OSAT factory, or in line with a fabrication line within a foundry or OSAT factory or other production environment to inspect or measure one or more parts of a device under test (e.g., a semiconductor device partially or fully processed, integrated circuits, or application processor chips/chiplets, or various memory devices). Such devices under test may include but are not limited to memory DRAM/HBM or 3DNAND/VNAND or SRAM, logic chips, passive components such as resistors, inductors, capacitors (MLCCs), or interconnect metal lines and traces such as redistribution lines in Si or interposers made on Si or on Glass or on/in the organic printed circuit boards, Cu metal planes or Cu plated vias in buildup substrates, high density connectors, or various classes of solder joints or solder bumps such as C2 microBumps (range of 3-30 micrometer diameter) or C2/C4 bumps (range of 30-100 micrometer diameter), and the advanced semiconductor packaging includes but not limited to: bumped wafer, System on IC (SoIC), fan-out wafer level package or FOWLP such as eWLB, FOcus, and InFO, or a Panel Level Packaging (PLP), fan-out panel level packaging (FOPLP), fine line redistribution lines (RDL) on substrates without Si interposers (high density interconnect or HDI with imbedded bridges or RDL on glass, other HDI printed circuit or wiring boards or PCB/PWB), Si interposers such as through Si-vias or TSV stacked wafers, Chip/Chiplets on Wafer (CoW), Chip/Chiplets on Wafer on Substrates (CoWoS), Chips/Chiplets on Substrates using flip chip BGA technology, embedded Chips/Chiplets in Substrate, wafer to wafer direct bonded interconnects or chip to wafer direct bonding also known as hybrid bumped components, and the like.

As illustrated in FIG. 8, video detection chain 800 comprises element 804 (e.g., a scintillator), element 806 (e.g., rad-hard glass), element 808 (e.g., objective lens), elements 810A-810D (e.g., convex lens moving between concave glass lenses), element 812 (e.g., reflective mirror), element 814 (e.g., final focus lens), and element 816 (e.g., scientific complementary metal oxide semiconductor (sCMOS) or regular grade CMOS or charge-coupled device (CCD) detector). Video detection chain 800 receives spatially coherent light waves 802. Light waves 802 are transmitted through a device under test. In one embodiment the device under test may be DUT 108. In one embodiment, light waves 802 are X-rays. Light waves 802 arrive at element 804. Element 804 transforms light waves into ultraviolet (uv) or visible optical light (e.g., LUAg, GaGG, BGO, LYSO from Saint Gobain or Hamamatsu). In one embodiment, the function of element 804 is to convert X-rays, with typical efficiencies of 20-100 visible photons per 1 keV of X-ray photons (1000 eV=1 keV), into visible light for subsequent optical transfer and focusing. In such an embodiment, the transformed X-rays are upconverted from short wavelengths to longer visible photon wavelengths within a narrow band of wavelengths centered at a single value determined by the scintillator peak fluorescence wavelength. The scintillator fluorescence nominal emission wavelength may be determined or adjusted by its material properties including chemical makeup and elemental doping atoms (e.g., such as peak emission at 420 nm wavelength for uv/blue light). This fluorescence is the conversion from X-ray to uv/visible light and subsequently enters a second element (for example, peak 420 nm light with a +/−25 nm band in wavelength), that is radiation hard glass such as lead glass (i.e., Schott Glass BK7G18 and LF5G19). The function of the rad-hard glass is to further remove any remaining X-rays that pass unconverted. In one embodiment, the distance between a device under test and element 804 may be greater than 10 mm but less than 1 meter to allow for proper propagation distance of the light waves that are incident on the device under test and to setup Fresnel fringes optimally.

Element 806 receives, from element 804, visible light and removes unwanted light waves that passed through element 804 without successful absorption by element 804. In one embodiment, the function of element 806 is to remove unwanted X-rays that pass through a scintillator without successful absorption during the scintillator's up conversion (i.e., conversion from X-ray to visible light).

Element 808 may be an objective lens to aid in magnifying visible light. Element 808 may have a numerical aperture of less than 0.75. The combination (or one or more parts) of element 804, element 806, and element 808 magnify the visible light created by element 804. In one embodiment, elements 810A-810C create an afocal lens subassembly of at least 3 lenses made of glass (i.e., 810A, 810B, and 810C). Element 810B may be mechanically moved between element 810A and element 810C in order to dynamically adjust the magnification of the visible light. The highest magnification may be achieved by moving element 810B closest to element 810A.

Elements 810D and 814 may be concave glass lens that are capable of projecting visible light received from element 808, through 810A-810C and reflected by element 812. Element 812 receives the magnified visible light from elements 810A-810C, and element 812's purpose is to redirect the uv/visible light through element 814 (e.g., a final imaging lens) and onto element 816. Element 812 effectively bends the path of only visible light and removes from the video chain/detector path any remaining damaging X-rays that rad-hard glass misses to absorb, known to cause color center defects in glasses making up the final lens and the camera. In one embodiment, element 812 is a reflective mirror positioned at 45 degrees (with respect to the optical axis of video detection chain 800) with cylindrical radial symmetry for geometry. The reflective mirror may be silver or aluminum metal coated component with a thin native oxide.

Element 814 may be a focus lens that is concave and places a 1× to 50× magnified image onto element 816. In one embodiment, final numerical apertures through element 814 are in the range of 0.3 to 0.75 numerical aperture (NA).

Element 816 is a detector that is capable of detecting visible light. In one embodiment, the detector is a pixelated camera such as a sCMOS, CMOS, or CCD camera.

FIG. 9 illustrates video detection chain 900. Video detection chain 900 comprises element 904 (e.g., a scintillator), element 906 (e.g., rad-hard glass), element 908 (e.g., condenser lens), element 910 (e.g., objective lens), element 912 (e.g., reflective mirror), element 914 (e.g., final focus lens), and element 916 (e.g., sCMOS or regular grade CMOS or charge-coupled device (CCD) detector). Video detection chain 900 receives spatially coherent light waves 902. Light waves 902 are transmitted through a device under test. In one embodiment the device under test may be DUT 108. In one embodiment, light waves 902 are X-rays. Light waves 902 arrive at element 904. Element 904 transforms light waves into ultraviolet (uv) or visible optical light (e.g., LUAg, GaGG, BGO, LYSO from Saint Gobain or Hamamatsu). In one embodiment, the function of element 904 is to convert X-rays, with typical efficiencies of 20-100 visible photons per 1 keV of X-ray energy (1000 eV=1 keV), into visible light for subsequent optical transfer and focusing. In such an embodiment, the transformed X-rays are upconverted in wavelength to visible photons within a narrow band of light centered at a single value determined by the scintillator peak fluorescence. The scintillator peak fluorescence nominal emission wavelength may be determined or adjusted by its material properties including chemical makeup and elemental doping atoms (e.g., such as 420 nm uv/blue light). This fluorescence is the conversion from X-ray to uv/visible light and subsequently enters a second element (for example, 420 nm light with a +/−25 nm band in wavelength), that is radiation hard glass such as lead glass (i.e., Schott Glass BK7G18 and LF5G19). The function of the rad-hard glass is to further remove any remaining X-rays that pass unconverted. In one embodiment, the distance between a device under test and element 804 may be greater than 10 mm but less than 1 meter to allow for proper propagation distance of the light waves that are incident on the device under test to set up efficient Fresnel fringe interference.

Element 906 receives, from element 904, visible light and removes unwanted light waves that passed through element 904 without successful absorption by element 904. In one embodiment, the function of element 906 is to remove unwanted X-rays that pass through a scintillator without successful absorption during the scintillator's up conversion (i.e., conversion from X-ray to visible light).

Elements 908 and 910 magnifies the visible light created by element 904. In one embodiment, elements 908 and 910 are fixed (as opposed to be mechanically moved to control magnification) and comprises of at least 2 glass concave lenses. Element 912 may reflect only visible light into element 914; a concave glass lens may have different magnification and numerical aperture in order to adjust the magnification of the visible light by mechanical translation of linear or rotary mechanism by computer control (e.g., 1×/NA=0.3, 20×/NA=0.75, etc.).

Element 912 receives the magnified visible light from elements 908 and 910 and redirects the uv/visible light to the element 914 (e.g., a final imaging lens) and video camera or element 916 to remove from the video chain/detector path any remaining damaging X-rays that rad-hard glass misses to absorb, known to cause color center defects in glasses making up the final lens and the camera. In one embodiment, element 912 is a reflective mirror positioned at 45 degrees (with respect to the optical axis of video detection chain 900) with cylindrical symmetry for geometry. The reflective mirror may be silver or aluminum metal coated element with a thin native oxide.

Element 914 may be a focus lens that is concave and adjusts the magnification to a value from 1× to 50× for the final magnified image onto element 916. In one embodiment, final numerical apertures through element 914 are in the range of 0.3 to 0.75.

Element 916 is a detector that is capable of detecting visible light. In one embodiment, the detector is a sCMOS, CMOS, or CCD camera.

Video detection chain 110 may, utilizing an internal or external processor, generate one or more electronic maps from the electronic signals created by element 112. The processor may receive from element 112 one or more frames. Each frame may contain a "shadow-gram." For example, a first frame may contain a first "shadow-gram" showing a grayscale image of a portion of DUT 108 or a color image representing various elements within DUT 108. The processor may retrieve/execute one or more machine learning models to process received frames to determine one or more phase contrast differences or composition differences across segments of the DUT (e.g., semiconductor wafer and advanced semiconductor packages being imaged). From the one or more frames electronic maps may be generated that indicate phase shift or fringe interference pattern disturbances. The electronic map may be outputted to a digital display via output 114. The electronic map may visually indicate x, y, and z coordinates/positions of one or more defects, their physical existence or count, and the metering of the physical extent or metrology to gauge repeatability or the variances in physical dimensions of components or circuit elements, or distribution for concentration of elements within the sample. In one embodiment, the processor may receive between 10-150 frames per second with pixel resolutions ranging between 0.1 microns to 10 microns for 50× to 1× optics, respectively.

Figure 4:
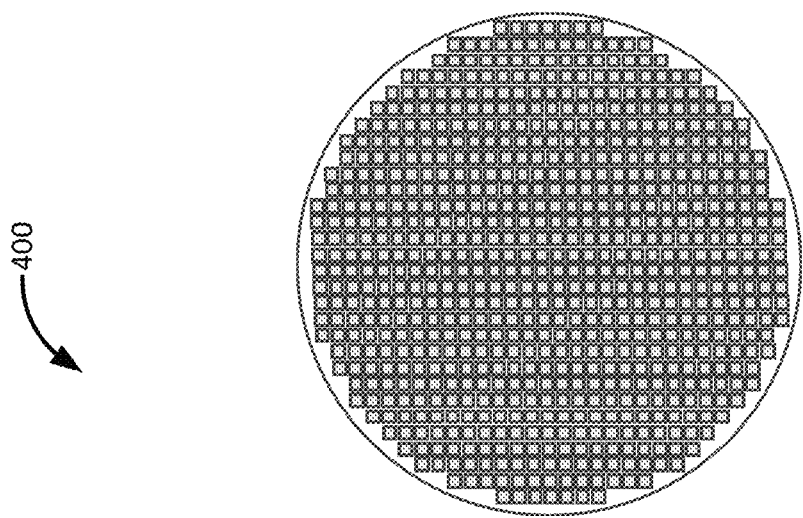
FIG. 4 depicts an example of an electronic map produced in accordance with one or more embodiments described herein.
Figure 5:
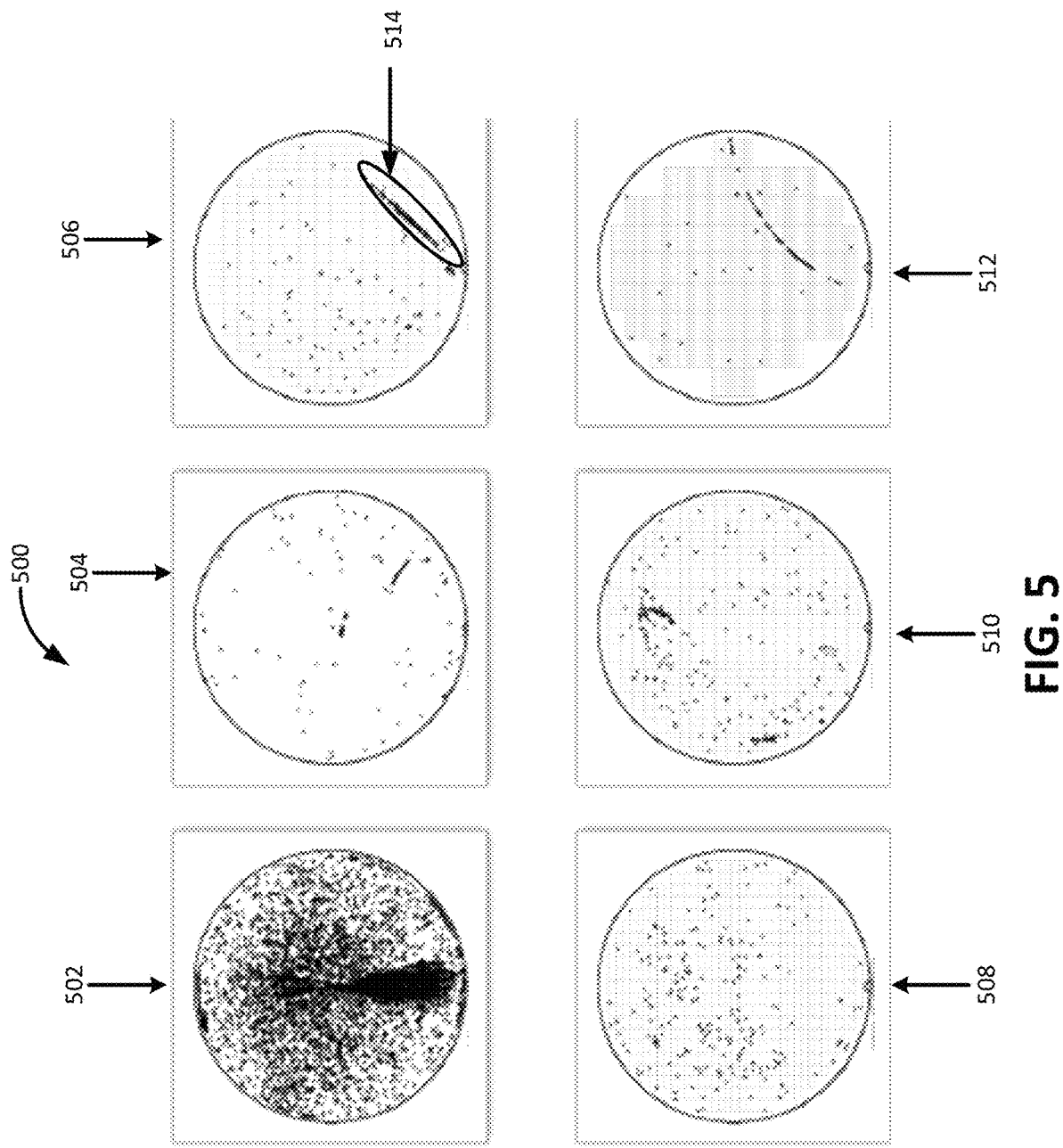
FIG. 5 depicts an example of an electronic map produced in accordance with one or more embodiments described herein.

FIGS. 4-5 depict an example electronic map generated and output by video detection chain 110. FIG. 4 depicts an electronic map 400 for a DUT where each square in the electronic map 400 represents a circuit element under test. FIG. 5 depicts "shadow-gram" images 502-512. Each "shadow-gram" image indicates one or more dark areas that are indicative of one or more defects. For example, "shadow-gram" 506 contains dark area 514. Dark area 514 may represent one or more defects in a DUT.

Because defect detection by video detection chain 110 may rely upon a combination of attenuation and change in phase angle, consideration can be given to the propagation distance of light waves incident on DUT 108. As described in reference to FIG. 3, the distance that a light wave propagates may directly affect the amount of data that can be read from the corresponding light wave. For example, if a light wave propagates a certain distance (e.g., less than 10 mm), all or some of any phase changes may not be detectable to video detection chain 110. Similarly, if the distance is, for example, larger than 1 meter, all or some of any phase changes may wash out and not be detectable to the video detection chain 110. In one embodiment, distance 116 represents an equal distance between light source attachments 106A or 106B and DUT 108 and between DUT 108 and element 112 enabling unity magnification with a large working distance between DUT to the first element of the video detection chain. For example, in one embodiment, distance 116 may be greater than 10 mm but less than 1 meter. In such an example, the distance between DUT 108 and element 112 (or another portion of a video detection chain) may be between 10 mm to 1 meter. Additionally, the action of utilizing light source attachments 106 to collimate the light waves uniquely enables (1) achieving zero blur from the light source, and creating a unity magnification imaging architecture with maximal field of view; (2) breaking tradeoff between achieving maximum field of view, highest submicron resolution, and largest distance between detector and DUT (i.e., the working distance); and (3) removing the DUT imaging noise resulting from its imperfections that would be multiplied with the parallax inherent in a non-collimated beam, such as a large total thickness due to stacking of numerous devices and wafers forming the DUT, the thickness variations across the DUT, and excessive bow/warp in the DUT due to typical loose tolerances in ASP and coefficient of thermal expansion mismatches in process within the advanced semiconductor packaging manufacturing environment. In traditional defect detection, maximizing the field of view produces a zero-propagation distance negating the use of phase coherence method and cannot establish interference fringes at the video detection chain. Thus, traditional defect detection methods are not capable of measuring the changes in phase coherence. Known devices that achieve unity magnification condition places the DUT exactly against the detector disabling completely phase coherence detection due to the lack of propagation distance between the DUT and the detector. In one embodiment, the distance between light source attachments 106A or 106B and DUT 108 may be different than the distance between DUT 108 and element 112.

In addition, to performing high-resolution microscopy on DUT 108, video detection chain 110 may include a sCMOS, CMOS, or CCD camera (or other detector) that is capable of determining, using imaging spectroscopy, the chemical makeup or material composition and quantifing the concentration or quantity of a specific element with DUT 108. One-way to achieve spectroscopy, photon counting may be used in conjunction with a detector in the detection chain 110. An X-ray photon of a given energy corresponding to the shadow-gram, yields a specific packet size of electrons in the sCMOS, CMOS, or CCD camera. This property can be used to selectively map a photon received back to its original energy by counting the number of electrons it can produce in a circuit. This technique is known as charge counting. In charge counting, a packet of electrons is generated per X-ray photon or visible photon. In other words, instead of integrating the charge arriving in any one pixel element over a fixed time, a thresholding circuit element that triggers an arrival event of sufficient size is used for counting and the thresholding circuit can sum subsequent arrival of electron packets when sufficiently large to accumulate the overall count for all events. This mode of detection is called photon counting or charge counting on the sCMOS or CMOS or CCD detector. This packet of electrons or charge can be processed electronically differently than by having a charge accumulation circuit that involves a transistor and a capacitor. In one embodiment, a counting circuit can be set up to sample the packet of electrons of a given size, followed by measuring against a critical threshold (i.e., determining if the packet is sufficiently large or not), and then counted as one count if above the critical threshold value representing a single energy for the original incoming X-ray photon. Then the count may be accumulated or added to the prior count with the counting circuit to decipher the total counts or events that arrived above the critical threshold value (e.g., number of photons arriving above the critical threshold). Multiple threshold circuits or multiple channels can then go through a multiplexer or MUX to move the critical threshold effectively through a set of threshold values (e.g., one threshold value per channel). Thus the multiple channels represent energy selection bins organized from lowest to highest and each pixel becomes a multichannel energy analyzer and every output image is the sum of all the channels of all the elements in DUT 108 that can be down selected electronically to represent one or more elements at a time for material distribution analysis, the quantity, or concentration in x, y, z space (the image becomes the distribution or concentration of one or more elements across DUT 108), including a single element at a time. The latter is a manner of counting N×N pixels that exceed a critical threshold instead of charge accumulation that cannot discriminate by energy at the detector 114. For example, the threshold may be set high enough to discriminate only the photons above a certain energy that have arrived to the pixel array that represent a single value of the element, removing the confusion or image analysis noise from the rest of the unwanted materials present in DUT 108, and delivering accurate distributions or concentration measurements over x, y, z space. Various methods may be used to walk this threshold down from high energy to low energy and decipher the charge packets at specific X-ray energies by energy value, also known as full spectral energy analysis. For instance, a map of pixels that arrive over a narrow range of energies can be determined by calculating a difference between two image scans at neighboring energy threshold values. These steps in threshold can be chosen fine or large to determine the delta in photon energy discrimination required. In one embodiment, thresholds can be used to differentiate elements in critical semiconductor circuit elements for process variation control and reliability such as Cu, Sn, Ag, and Si. In another embodiment, the image of DUT 108 may represent the metal interconnect lines comprised of Cu, and the image formed by setting energy thresholds to count only X-rays emanating from absorption due to only Cu, and the disparity map between like areas of Cu would find the Cu-related defects or process or assembly variations in fabricating fine Cu features. Similarly, for Sn in solder, thresholds may be set to count only the X-rays impacted by absorption of Sn (near the k-edge or L-edge of Sn), and this could be used to find disparity maps between like Sn areas, and would outline defects related to only Sn variation or missing solder or bridging solder or solder excursion or solder needles that are thin and near impossible to detect with traditional X-rays. This sifting in energy results in elemental or compositional specific image formation and defect inspection mode for material analysis using an entirely optical video chain system.

Unity magnification as used herein may refer to approximately (or in cases where technology allows for it) a 1:1 ratio between an image (that is created by light incident upon DUT 108) cast onto (i.e., received) by element 112 and the corresponding portion of DUT 108. For example, if an imaged portion of DUT 108 is 1×1 then the image cast onto element 112 is also 1×1 (or possibly 1×1.2 or 1.2×1, and the like). In such an example, the imaged portion of DUT 108 may be a portion of DUT 108 that is under inspection at a particular point in time.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, systems, methods, and media for carrying out the several purposes of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

What is claimed:

1. A system comprising:
a light emitting device that outputs a light beam capable of penetrating a device under test at least to a first depth, the device under test comprising an advanced semiconductor package, wherein the light beam, upon initial output, comprises spatially coherent light waves, wherein the light emitting device comprises an incoherent light source and a light source attachment, wherein the light source attachment comprises a thin film waveguide and the light source attachment converts incoherent light waves emitted from the incoherent light source into spatially coherent light waves;
a detector that transforms light waves that were incident on the device under test into visible optical light, wherein the detector is placed between 10 millimeters and 1 meter away from the device under test;
wherein the detector is configured to:
generate, based on the visible optical light, one or more electronic maps indicating one or more concentrations or distributions of elements within the device under test,
cracks, breaks, gaps, or air pockets indicating one or more defects within the device under test based on Fresnel fringe interference patterns developed by the light waves, coordinates of the one or more defects, metering of physical extent or metrology to gauge repeatability or variances in physical dimensions of components or circuit elements within the device under test; and
wherein the one or more electronic maps comprises a plurality of squares representing at least one circuit element in the device under test.

2. The system of claim 1, wherein the detector comprises a scientific complementary metal oxide semiconductor (sCMOS), a regular grade CMOS, or a charged-coupled device (CCD) detector.

3. The system of claim 1, wherein the detector comprises an afocal subsystem that includes one or more elements that are dynamically adjustable to change a magnification and numerical aperture of the visible optical light.

4. The system of claim 1, wherein the incoherent light source has dimensions that do not exceed 50 millimeters×50 millimeters×50 millimeters.

5. The system of claim 1, wherein each of length, width, and height of the device under test is between 10 millimeters and 500 millimeters and the first depth of the device under test is 725 microns.

6. The system of claim 1, wherein the light source attachment comprises a monocapillary or a polycapillary.

7. The system of claim 1, wherein the detector generates the one or more electronic maps based at least in part on attenuation and phase coherence disturbances associated with the light waves that are incident on the device under test.

8. The system of claim 1, wherein the light emitting device comprises an X-ray and the one or more defects comprises of gaps, breaks, or cracks within the device under test.

9. A system for defect detection within semiconductor devices comprising:
a light emitting device that outputs a light beam capable of penetrating a device under test at least to a first depth, the device under test comprising an advanced semiconductor package, wherein the light beam, upon initial output, comprises spatially coherent light waves, wherein the light emitting device comprises an incoherent light source and a light source attachment, wherein the light source attachment comprises a thin film waveguide and the light source attachment converts incoherent light waves emitted from the incoherent light source into the spatially coherent light waves; and
a detector, wherein:
the detector is placed between 10 millimeters and 1 meter away from the device under test;
the detector receives, based at least in part on light waves that were incident on the device under test, an image of at least a portion of the device under test, wherein the magnification of the size of the image is in unity to the size of the portion of the device under test;

the detector, based on the image of at least the portion of the device under test, generates an electronic map indicating one or more defects within the device under test based on Fresnel fringe interference patterns developed by the light waves; and the detector outputs the electronic map;

wherein the electronic map contains a plurality of squares representing at least one circuit element in the device under test.

10. The system of claim 9, wherein the incoherent light source has dimensions that do not exceed 50 millimeters×50 millimeters×50 millimeters.

11. The system of claim 9, wherein the incoherent light source has dimensions that do not exceed 50 millimeters×50 millimeters×50 millimeters and the light source attachment has dimensions that do not exceed 200 millimeters in length and 50 millimeters in diameter.

12. The system of claim 9, wherein the light emitting device comprises an X-ray and the one or more defects comprises of gaps, breaks, or cracks within the device under test.

13. The system of claim 9, wherein the electronic map indicates a chemical composition of one or more material layers within the device under test.

14. The system of claim 9, wherein the electronic map indicates one or more of the following: a length of one or more portions of the device under test, an area of one or more portions of the device under test, a size of one or more portions of the device under test, or metrology of one or more portions of the device under test.

15. A method for defect detection within semiconductor devices comprising:

outputting, from a light emitting device comprising an incoherent light source and a light source attachment, a light beam capable of penetrating a device under test at least to a first depth, wherein the light beam comprises spatially coherent light waves, wherein the light source attachment comprises a thin film waveguide and the light source attachment converts incoherent light waves emitted from the incoherent light source into spatially coherent light waves;

receiving, by a detector, based at least in part on light waves that were incident on the device under test, an image of at least a portion of the device under test, wherein the magnification of the size of the image is in unity to the size of the portion of the device under test, the detector being placed between 10 millimeters and 1 meter away from the device under test;

generating, based at least in part on the image of at least the portion of the device under test, an electronic map indicating one or more defects within the device under test based on Fresnel fringe interference patterns developed by the light waves; and outputting the electronic map.

16. The system method of claim 15, wherein each of length, width, and height of the device under test is between 10 millimeters and 500 millimeters and the first depth of the device under test is 725 microns.

17. The method of claim 15, wherein the light emitting device comprises an X-ray and the one or more defects comprises of gaps, breaks, or cracks within the device under test.

18. The method of claim 15, wherein the electronic map indicates one or more of the following: a length of one or more portions of the device under test, an area of one or more portions of the device under test, a size of one or more portions of the device under test, metrology of one or more portions of the device under test, or a chemical composition of one or more material layers within the device under test.

* * * * *